(12) United States Patent
Barnes

(10) Patent No.: US 10,794,433 B2
(45) Date of Patent: Oct. 6, 2020

(54) PISTON FOR CLUTCH ASSEMBLY

(71) Applicant: Schaeffler Technologies AG & Co. KG, Herzogenaurach (DE)

(72) Inventor: Jay Barnes, Clinton Township, MI (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 165 days.

(21) Appl. No.: 16/033,544

(22) Filed: Jul. 12, 2018

(65) Prior Publication Data

US 2019/0085911 A1  Mar. 21, 2019

Related U.S. Application Data

(60) Provisional application No. 62/560,911, filed on Sep. 20, 2017.

(51) Int. Cl.
| | |
|---|---|
| *F16D 25/12* | (2006.01) |
| *F16D 13/52* | (2006.01) |
| *F16J 1/00* | (2006.01) |
| *F15B 15/14* | (2006.01) |
| *F16D 25/0638* | (2006.01) |
| *F16C 19/30* | (2006.01) |

(52) U.S. Cl.
CPC .......... *F16D 25/12* (2013.01); *F15B 15/1447* (2013.01); *F16D 13/52* (2013.01); *F16J 1/005* (2013.01); *F16C 19/30* (2013.01); *F16D 25/0638* (2013.01); *F16D 2250/0061* (2013.01)

(58) Field of Classification Search
CPC ...... F16D 25/12; F16D 13/52; F16D 25/0638; F16D 2250/0061; F16J 1/005; F15B 15/1447; F16C 19/30
See application file for complete search history.

(56) References Cited

U.S. PATENT DOCUMENTS

| | | | | |
|---|---|---|---|---|
| 5,234,090 | A * | 8/1993 | Haka ..................... | F16D 25/082 188/196 P |
| 5,931,275 | A * | 8/1999 | Kasuya ............... | F16H 63/3026 192/109 R |
| 8,463,482 | B2 * | 6/2013 | Rains ...................... | F16H 57/01 192/70.251 |
| 8,747,279 | B2 * | 6/2014 | Furuichi ............... | F16D 25/044 477/5 |
| 9,080,612 | B2 * | 7/2015 | Fujii ..................... | F16D 25/082 |
| 9,222,524 | B2 * | 12/2015 | Saito ..................... | B60K 6/387 |

(Continued)

*Primary Examiner* — Tinh Dang
(74) *Attorney, Agent, or Firm* — Reid A. Baldwin

(57) ABSTRACT

Pistons and clutch assemblies including the pistons are disclosed. A clutch assembly may include at least one rotatable clutch plate, a reaction plate arranged to rotate with and apply a force to the at least one rotatable clutch plate, and a spring configured to urge the reaction plate away from the at least one rotatable clutch plate. A piston may be provided including a first segment formed as a plate and defining an internal space between the first segment and a housing and a second bulk segment that occupies at least a portion (e.g., 50% by volume) of the internal space. At least one bearing rolling element may be arranged between the reaction plate and the piston to permit relative rotational motion therebetween. The second bulk segment may be formed of plastic or a plastic composite and may reduce the amount of hydraulic fluid present in the internal space.

13 Claims, 2 Drawing Sheets

(56) References Cited

U.S. PATENT DOCUMENTS

| | | | |
|---|---|---|---|
| 9,347,501 B2* | 5/2016 | Akimoto | F16D 13/52 |
| 9,593,724 B2 | 3/2017 | Hemphill et al. | |
| 9,765,829 B2* | 9/2017 | Carr | F16D 13/52 |
| 2010/0288597 A1* | 11/2010 | Kuwahara | B60K 6/387 |
| | | | 192/85.61 |
| 2011/0221292 A1* | 9/2011 | Kuwahara | F16D 25/082 |
| | | | 310/78 |
| 2015/0267760 A1* | 9/2015 | Hemphill | F16D 13/52 |
| | | | 192/70.11 |

* cited by examiner

PISTON FOR CLUTCH ASSEMBLY

TECHNICAL FIELD

The present disclosure relates generally to a piston for a clutch assembly.

BACKGROUND

Transmission systems may include clutch assemblies. Such clutch assemblies may include a piston. During an engagement, the piston may be urged towards a clutch pack. An axial force from the piston may ultimately cause the clutch to be engaged.

SUMMARY

In at least one embodiment, a clutch assembly is provided. The clutch assembly may include at least one rotatable clutch plate; a reaction plate arranged to rotate with and apply a force to the at least one rotatable clutch plate; a spring configured to urge the reaction plate away from the at least one rotatable clutch plate; a piston; and at least one bearing rolling element arranged between the reaction plate and the piston to permit relative rotational motion therebetween. The piston may include a first segment formed as a plate and defining an internal space between the first segment and a housing; and a second bulk segment that occupies a portion of the internal space.

In one embodiment, the second bulk segment is formed of plastic or a plastic composite. The second bulk segment may occupy at least 50% or at least 75% by volume of the internal space. The housing may at least partially surrounds the piston. In one embodiment, the second bulk segment defines a cavity with the housing that is configured to receive a hydraulic fluid. In another embodiment, the cavity extends radially along only a portion of an axial end face of the second bulk segment. At least one o-ring may be disposed between the first segment and the second bulk segment in an axial direction and the cavity may not axially overlap with the at least one o-ring in the axial direction. The second bulk segment may be press-fit into the first segment. In one embodiment, the first segment includes a bearing raceway configured to directly contact the at least one bearing rolling element. In another embodiment, a washer may be disposed between the first segment and the at least one bearing rolling element, the washer including a bearing raceway configured to directly contact the at least one bearing rolling element.

In at least one embodiment, a piston for a clutch assembly is provided. The piston may include a first segment formed as a plate and defining an internal space between itself and a housing of the clutch assembly; and a second segment formed as a bulk support piece. The second segment may be formed of plastic or a plastic composite.

In one embodiment, the second segment may occupy at least 50% or at least 75% by volume of the internal space. The second segment may define a cavity with the housing that is configured to receive a hydraulic fluid. In one embodiment, the cavity extends radially along only a portion of an axial end face of the second segment. At least one o-ring may be disposed between the first segment and the second segment in an axial direction and the cavity may not axially overlap with the at least one o-ring in the axial direction. In one embodiment, the second segment is press-fit into the first segment. In another embodiment, the first segment includes a hardened bearing raceway configured to directly contact a bearing rolling element of the clutch assembly.

DETAILED DESCRIPTION

At the outset, it should be appreciated that like drawing numbers appearing in different drawing views identify identical, or functionally similar, structural elements. Furthermore, it is understood that this disclosure is not limited only to the particular embodiments, methodology, materials and modifications described herein, and as such may, of course, vary. As those of ordinary skill in the art will understand, various features illustrated and described with reference to any one of the figures can be combined with features illustrated in one or more other figures to produce embodiments that are not explicitly illustrated or described.

The terminology used herein is for the purpose of describing particular aspects only, and is not intended to limit the scope of the present disclosure, which is limited only by the appended claims. It is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments.

Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
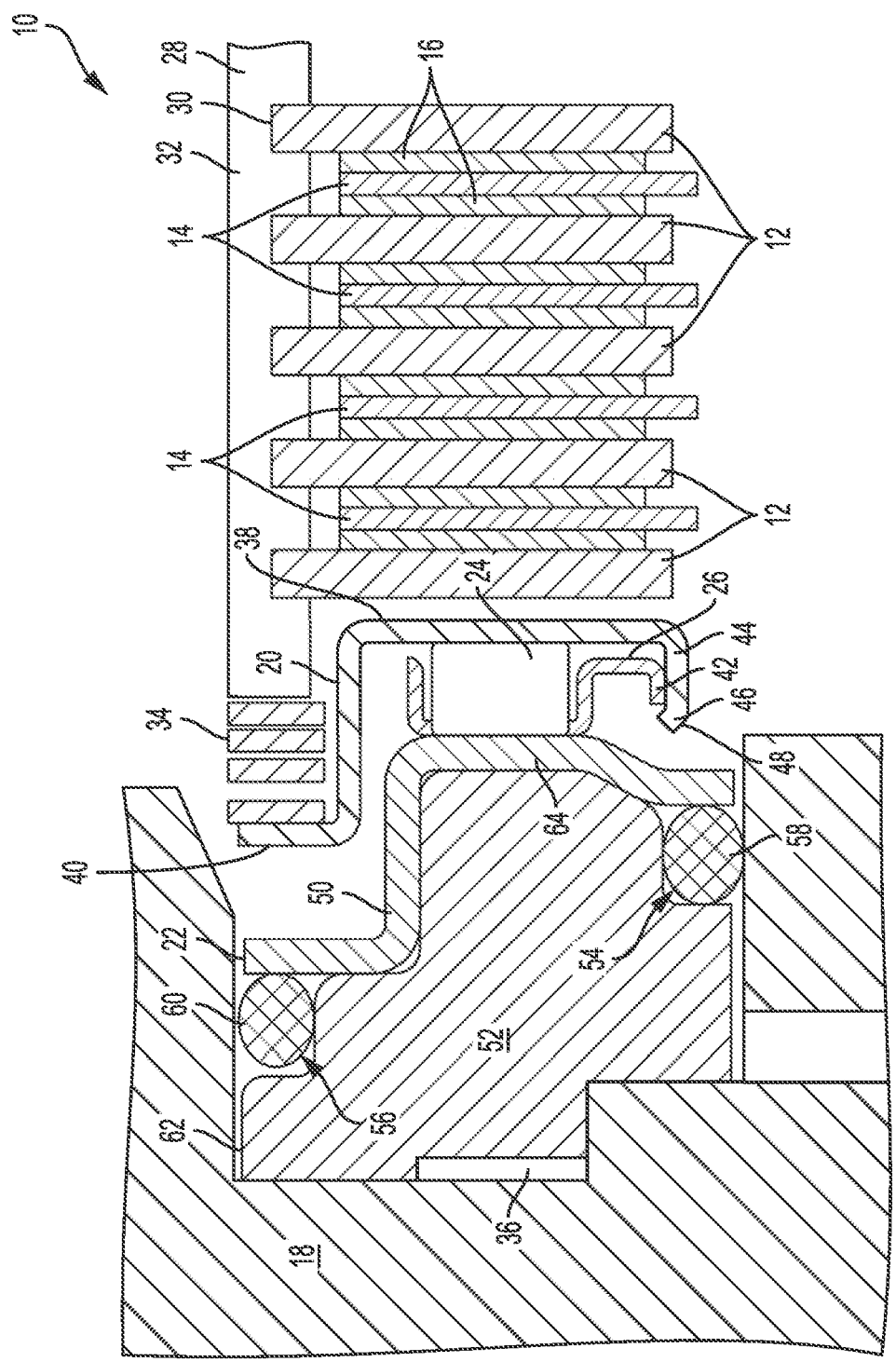
FIG. 1 is a cross-sectional view of a clutch assembly, according to an embodiment.

With reference to FIG. 1, an example cross-sectional view of a clutch assembly 10 is shown. The clutch assembly 10 may be a transmission clutch assembly and may be incorporated into, for example, a rear differential unit (RDU), a front differential unit (FDU), or a power transfer unit (PTU). Transmission clutch assembly 10 includes clutch plates 12 and friction plates 14 which may be collectively referred to as a clutch pack. Friction plates 14 include friction material rings 16 on each side. Clutch plates 12 are rotatable with respect to housing 18 for the transmission. Although five clutch plates and four friction plates are shown, other numbers of clutch plates and friction plates are possible. An example of a clutch assembly is shown and described in U.S. Pat. No. 9,593,724, filed Feb. 27, 2015, the entire disclosure of which is incorporated by reference herein. The description and embodiments disclosed therein in may be combined with the present disclosure to create further embodiments.

Transmission clutch assembly 10 may include reaction plate 20, piston 22, bearing rolling element 24, and cage 26. Reaction plate 20 (which may also be referred to as a Z-disk) may be arranged to rotate with and apply a force to clutch plate 12, although in other embodiments, plate 20 may apply a force to one of friction plates 14. In other words, the reaction plate may be configured to engage the clutch pack.

Piston 22 may be rotatable or non-rotatable with respect to housing 18 and/or sealed to housing 18. During normal operation of clutch assembly 10, piston 22 may not rotate in the housing, allowing for a robust sealing and decreased leakage at the seal, thereby reducing pumping losses.

Bearing rolling element 24 may be arranged between and/or contactable with the reaction plate 20 and the piston 22 to permit relative rotational motion therebetween. In one embodiment, the bearing rolling elements 24 may run directly on the piston 22. In another embodiment, the bearing rolling elements 24 may run on an intermediate component, such as a washer. Bearing rolling element 24 may be one of a plurality of rolling elements, such as cylindrical rollers, arranged to roll between the reaction plate 20 and piston 22 during relative rotation between the two components. Cage 26 is for retaining and positioning rolling elements 24 radially and maintaining proper spacing in a circumferential direction. Cage 26 may be retained by reaction plate 20, as described below. The bearing rolling element 24 and cage 26 may be collectively referred to as a bearing element.

Clutch carrier 28 may be rotationally engaged with clutch plate 12. That is, the clutch plate 12 may have an external toothed portion 30 engaged with a carrier internal complementary spline portion 32 so that the clutch plate 12 and carrier rotate in unison but the clutch plate can still move axially in the carrier to engage the clutch. Otherwise stated, the clutch pack is installed in the carrier. Rearmost clutch plate 12 may be axially retained by a carrier feature or snap ring (not shown). Release spring 34 may be installed between and compressively engaged with the clutch carrier 28 and the reaction plate 20 to urge the reaction plate 20 away from the clutch plate 12. That is, without sufficient hydraulic pressure acting on the housing 18 and piston 22 to engage the clutch, spring 34 may disengage the clutch. In one embodiment, the spring 34 may be a wave spring.

Reaction plate 20 may include radial portion 38, which may be contactable with the rotatable clutch plate 12 on one side and the bearing rolling element 24 on the other side. Reaction plate 20 may include radial portion 40 contactable with the spring. Portion 38 may be radially inside of portion 40. Portion 40 may also include a toothed portion (not shown) engaged with clutch carrier spline portion 32 so that the reaction plate 20 and the clutch carrier 28 are rotationally connected.

Cage 26 may include circumferential ring 42. Reaction plate 20 may include circumferential ring 44 with a radial bump 46 at distal end 48. Cage ring 42 may be retained by radial bump 46. That is, the cage 26 may be retained on the reaction plate 20 and prevented from being removed by the bump 46. The bump 46 may be a pre-formed feature in which case the cage 26 would be snapped onto the reaction plate 20, or the bump 46 may be formed after the cage 26 is installed onto the reaction plate 20 by staking or the like.

Figure 2:
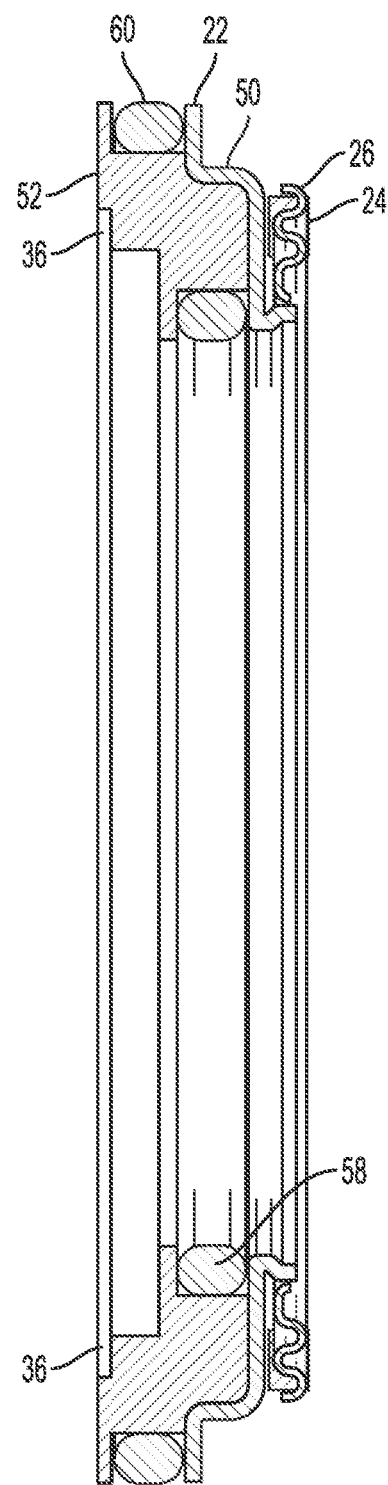
FIG. 2 is a cross-sectional view of a piston for use in a clutch assembly, according to an embodiment.

With reference to FIGS. 1 and 2, piston 22 may include segments 50 and 52. The segments may be fixed to one another, however, fixation is not required. A pair of o-ring grooves 54 and 56 may be provided between the segments. In one embodiment, segment 50 may be a plate, for example, a metal plate. Segment 50 may be formed by stamping and may be formed of steel. In another embodiment, segment 52 may formed of a plastic (e.g., a polymer) or composite material (e.g., a polymer-fiber composite). Segment 52 may be referred to as a support piece, an insert, or a washer. Segment 52 may be referred to as having a bulk shape, such that it has a substantial or significant thickness dimension. This may be in contrast to the plate segment 50 that has a relatively minor thickness compared to the other dimensions. Segment 52 may replace a second plate (e.g., stamped sheet like segment 50) that is typically present in the piston 22. In such configurations, the two plates would form a large cavity between themselves and the housing 18. This cavity would receive a fluid (e.g., oil or another hydraulic fluid) which would cause the piston 22 to move (described in more detail, below). However, the size of the cavity in these designs may require a relatively large volume of fluid to operate.

In at least one embodiment, the segment 52 may occupy a large portion of the space between the segment 50 and the housing 18. This space may be defined, for example, by the radially inner and outermost ends of the segment 50. Alternatively, the space may be defined radially between the o-rings 58 and 60. In one embodiment, the majority of the space may be filled (e.g., >50% by volume) by segment 52. In another embodiment, at least 75%, 80%, 85%, 90%, or 95% of the space may be filled by the segment 52. In other embodiments, the segment 52 may occupy at least 10%, 25%, or 35% of the space.

In one embodiment, as shown, an axially narrow cavity 36 may be formed between the segment 52 and the housing 18. The cavity 36 may extend radially along only a portion of the axial end face of the segment 52, as shown. However, in other embodiments, the cavity 36 may extend along all, or substantially all, of the axial end face. The cavity 36 may be axially narrow such that it does not axially overlap with the o-ring 60. The cavity 36 may be configured to receive a hydraulic fluid via an opening or channel in the housing (not shown). However, compared to the typical piston configuration, described above, the amount/volume of fluid needed to fill the cavity 36 may be substantially smaller. This may be due to the cavity 36 being smaller because the segment 52 occupies a larger space within the segment 50.

Segments 50 and 52 may be fixed together by any suitable technique, such as press-fitting, adhesives, or riveting (or other fasteners), for example. Segment 50 may be contactable with bearing rolling element 24 on a radial portion 64 (e.g., radial portion 64 may be a bearing raceway). In such an embodiment, the segment 50 may be a hardened metal, such as steel. In other embodiments, the segment 50 may not directly contact the rolling element 24 (e.g., there may be at intermediate component). Segment 52 may include an axial protrusion 62 for limiting a disengagement travel of piston 22. Piston 22 may include o-rings 58 and 60 installed in grooves 54 and 56, respectively, for sealing with inner and outer portions, or circumferential surfaces, of the housing, respectively. In other words, o-rings 58 and 60 may be radially inner and outer seals, respectively.

During an engagement, hydraulic pressure in chamber 36 may urge piston 22 towards the clutch pack. An axial force from the piston 22 may act on bearing rolling element 24, which in-turn acts on reaction plate 20, overcoming force from spring 34. The reaction plate 20 may press against clutch plate 12 to clamp the clutch pack and engage the clutch. Because the reaction plate and the clutch plate are both rotationally fixed to the clutch carrier and rotate together, there may be no relative motion between the two components. In other embodiments, the two may not be rotationally connected, but friction from spring 34 acting on the reaction plate 20 and the clutch carrier 28 may keep the two at a similar rotational speed. Bearing rolling element 24 may effectively rotationally disconnect the piston 22 from the rotating reaction plate 20 so that the piston 22 is not rotating and can use conventional static seals against the non-rotating housing.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A clutch assembly comprising:
   at least one rotatable clutch plate;
   a reaction plate arranged to rotate with and apply a force to the at least one rotatable clutch plate;
   a spring configured to urge the reaction plate away from the at least one rotatable clutch plate; and
   a piston;
   at least one bearing rolling element arranged between the reaction plate and the piston to permit relative rotational motion therebetween;
   wherein the piston includes:
      a first segment formed as a plate and defining an internal space between the first segment and a housing;
      a second segment that occupies a portion of the internal space:
      the second segment defines a cavity with the housing, the cavity configured to receive a hydraulic fluid;
      at least one o-ring is disposed between the first segment and the second segment in an axial direction; and
      the cavity does not axially overlap with the at least one o-ring.

2. The clutch assembly of claim 1, wherein the second segment is formed of plastic or a plastic composite.

3. The clutch assembly of claim 1, wherein the second segment occupies at least 50% by volume of the internal space.

4. The clutch assembly of claim 1, wherein the cavity extends radially along only a portion of an axial end face of the second bulk segment.

5. The clutch assembly of claim 1, wherein the second segment is press-fit into the first segment.

6. The clutch assembly of claim 1, wherein the first segment includes a bearing raceway configured to directly contact the at least one bearing rolling element.

7. A piston for a clutch assembly, comprising:
   a first segment formed as a plate and defining an internal space between itself and a housing of the clutch assembly; a second segment formed as a bulk support piece; and
   an inner o-ring disposed axially between the first segment and the second segment on a radially inner side of the piston;
   wherein the second segment is formed of plastic or a plastic composite and occupies a portion of the internal space,
   wherein the second segment defines a cavity with the housing and
   wherein the cavity does not axially overlap with the inner o-ring.

8. The piston of claim 7, wherein the second segment occupies at least 50% by volume of the internal space.

9. The piston of claim 7, wherein the cavity extends radially along only a portion of an axial end face of the second segment.

10. The piston of claim 7, wherein the second segment is press-fit into the first segment.

11. The piston of claim 7, wherein the first segment includes a hardened bearing raceway configured to directly contact a bearing rolling element of the clutch assembly.

12. The piston of claim 7 further comprising an outer o-ring disposed axially between the first segment and the second segment on a radially outer side of the piston wherein the cavity does not axially overlap with the outer o-ring.

13. A clutch assembly comprising:
   at least one rotatable clutch plate;
   a reaction plate arranged to rotate with and apply a force to the at least one rotatable clutch plate;
   a spring configured to urge the reaction plate away from the at least one rotatable clutch plate; and
   a piston;
   at least one bearing rolling element arranged between the reaction plate and the piston to permit relative rotational motion therebetween;
   wherein the piston includes:
      a first segment formed as a plate and defining an internal space between the first segment and a housing; and
      a second segment that occupies at least 50% by volume of the internal space.

* * * * *